Patented June 26, 1934

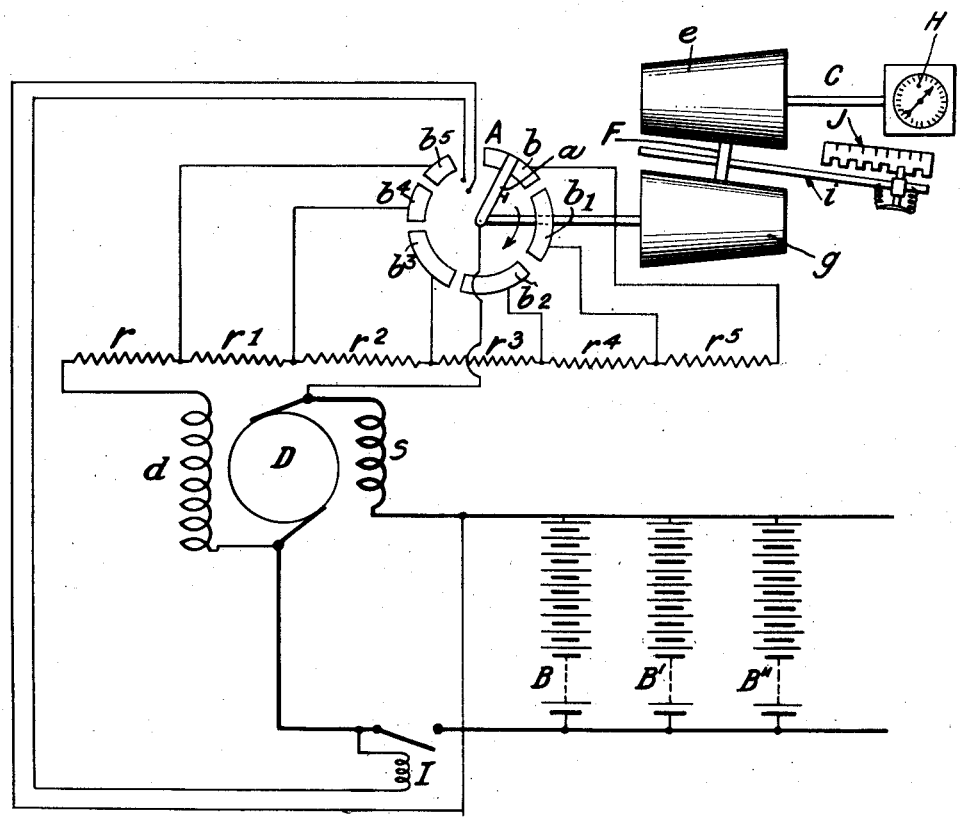

1,964,246

UNITED STATES PATENT OFFICE 1,964,246

APPARATUS FOR AUTOMATICALLY CHARGING BATTERIES

Henri Benit, Paris, France

Application September 18, 1930, Serial No. 482,912
In France June 18, 1930

4 Claims. (Cl. 171—314)

In a prior patent application No. 412,530 filed December 7th, 1929 I have described a method of automatically charging batteries which permits of utilizing the whole of the time available for effecting the charging operation which method is characterized by the regulation alone of the initial intensity of charge, a function of the characteristics of the generator of the charging current, of the time available for charging, and of the fraction of the capacity debited by the battery.

This method necessitates preliminary knowledge at least approximately of the fraction of the capacity debited.

The method of charging forming the subject of the present invention permits of automatic charging within the maximum time available without necessitating any knowledge of the fraction of the capacity debited. It is characterized by this that the voltage of the charging generator is regulated automatically according to a law determined as a function of the time.

This method is based on the observation that if the curves of variation in voltage at the terminals of a battery during a charge of decreasing intensity at constant time are traced these curves are very close whatever the fraction of the capacity which has been debited. Such curves are substantially straight lines of the same inclination and they terminate in a horizontal part when charging is completed.

If the total time of charge is varied substantially the same curves are obtained whatever the time provided there are used as the abcissæ, not the absolute time but the relative time taking as unity the total time of charging. The temperature has an important effect on the values of the voltage the latter being smaller the higher the temperature. With considerable changes of temperature however it is easy to make a correction by raising or lowering the straight lines by about 0.03 volts per element per 10° C. of change.

In order to charge in predetermined maximum time batteries which are more or less discharged it is sufficient to regulate the voltage of the charging generator so as to reproduce these straight lines as a function of the time and there will thus be obtained the charge desired with decreasing intensity.

For example if there is available a time "$t$" for charging the voltage of the generator will be regulated so as to have the following voltages for a number "$n$" of lead accumulators of the battery, the temperature of the latter being normal (20 to 30° C. in the elements).

2.15 "$n$" volts at the commencement of the charge
2.22 "$n$" volts after a time equal to 0.2 "$t$"
2.29 "$n$" volts after a time equal to 0.4 "$t$"
2.36 "$n$" volts after a time equal to 0.6 "$t$"
2.43 "$n$" volts after a time equal to 0.8 "$t$"
2.46 "$n$" volts after a time equal to 0.9 "$t$"
2.46 "$n$" volts after a time equal to "$t$"

It should be noted that the small differences in the curves of the voltage according to the different conditions of time of charge and of fraction of the capacity debited are observable mainly at the end of the charge. As at this moment the charging currents have become very small, by adopting a mean value in all the cases there is only risk of a very small excess charge at a safe voltage or a very small insufficiency of charge in extreme cases.

Such a method of charging may be rendered very easily automatic since it will be sufficient to cause a regulatable clockwork mechanism to act by one of the numerous means known for a definite time on the exciting rheostat of the generator. The operation will be easier the nearer the law of variation is to linear.

The drawing shows a particular embodiment of the invention.

The dynamo D adapted to charge batteries B, B', B'', (which can be in various states of discharge) is a compound dynamo the series field winding being shown at $s$. This compound winding of the dynamo is necessary to keep the dynamo voltage substantially independent of the charging current which is variable according to time and variable also as to the discharge state of the batteries.

Inserted in the field winding $d$ of the dynamo is a rheostat comprising different fixed resistances $r$, $r_1$, $r_2$, $r_3$, $r_4$ and $r_5$ calculated or designed to give to the dynamo the different voltages which are desired successively, which according to the example previously chosen should be 2.15$n$, 2.22$n$, $2.36n$, $2.43n$ and $2.46n$ volts, the letter $n$ being taken as the number of cells in the batteries.

The end of each resistance extends to various switch segments $b$, $b_1$, $b_2$, $b_3$, $b_4$, $b_5$, of a fixed plate A. Upon these segments a conducting switch arm $a$ is adapted to contact, which arm is connected to one terminal of the dynamo.

This arm is driven by a clockwork mechanism H regulated in known manner, by a system of friction cones for example, so as to cause it to effectuate its complete travel from the beginning of the first segment $b$ to the end of the final segment $b_5$ in the total time available for the charging of the batteries. In view of this the mechanism H in the form of a clock carries a spindle $c$ coupled to that of a cone $e$ whose rotation is transmitted by friction and through the roller or rider $f$ to a second cone $g$ whose spindle drives the rheostat arm $a$. The mechanism H is so designed that the duration of one revolution of its spindle $c$ corresponds to the average duration of the charge of a battery. When the rider $f$ is displaced to its extreme left position the speed of rotation of the cone $g$ is a minimum and corresponds to the maximum duration of the charge of the batteries, and, inversely, when the rider occupies its extreme right hand position, the cone $g$ rotates at its maximum speed corresponding to the shortest duration adopted for the charging of the batteries. The choice of the duration of the charging is very simple; it is merely necessary to adapt to the rider $f$ an index travelling over a scale graduated in hours.

The opening of the charging circuit is done by means of a switch I having a magnet coil for tripping the switch, which coil is closed by the arm $a$ at the end of its run. The segments $b$, $b_1$, $b_2$, $b_3$, $b_4$, $b_5$, each have lengths proportional to the times during which the various voltages must be maintained. In the example given above $b$, $b_1$, $b_2$, $b_3$, are of the same length while $b_4$ and $b_5$ are only half as long.

Evidently, the resistance of the circuit connecting the batteries to the dynamo must be sufficiently low so that the voltage at the terminal of the batteries B, B', B'', will not be dependent on the charging current circulating in this circuit and remain practically the same as the voltage of the terminals of the dynamo.

The generator which is required to charge simultaneously a number of batteries having the same number of elements but of different capacity, and having debited different fractions of their capacity will have a compound winding so as to render its voltage independent of the intensity and only variable as above indicated as a function of the time.

In lieu of clockwork mechanism acting directly on the excitation of the generator there could be employed a metric voltage regulator having a voltage variable as above as a function of the time.

Having thus described my invention, I claim:—

1. In a system for the automatic charging of storage batteries at decreasing charging rate and predetermined charging time, an electric generator connected to a battery to be charged, means to regulate the voltage of said generator as an increasing linear function of the time during the charging period, and a time switch opening the charging circuit after the expiration of the predetermined charging time.

2. In a system for the automatic charging of storage batteries at decreasing charging rate and predetermined charging time, an electric generator connected to a battery to be charged, means to increase the voltage of said generator by equal steps each of constant duration, and a time switch opening the charging circuit after the expiration of the predetermined charging time.

3. In means for automatically charging storage batteries at tapering charge and predetermined maximum charging time, a charging generator adapted to charge a battery connected thereto, an automatic voltage regulator, a clockwork mechanism associated with said regulator to vary the voltage maintained by said regulator as a function of the time during the charging period, and a time switch opening the charging circuit after the said charging period has expired.

4. Apparatus for the automatic charging of storage batteries at decreasing current and predetermined charging time, comprising a current generator placed in circuit with a battery to be charged, a voltage regulator device for this generator adapted to vary the voltage as an increasing function of the time during the charging period, and a time switch opening the charging circuit at the end of the time fixed for the charge.

HENRI BENIT.